United States Patent [19]

Ohnishi

[11] Patent Number: 4,559,596
[45] Date of Patent: Dec. 17, 1985

[54] HISTORY MEMORY CONTROL SYSTEM

[75] Inventor: Katsumi Ohnishi, Kawagoe, Japan

[73] Assignee: Fujitsu Limited, Kawasaki, Japan

[21] Appl. No.: 509,647

[22] Filed: Jun. 30, 1983

[30] Foreign Application Priority Data

Jun. 30, 1982 [JP] Japan ............................... 57-113464

[51] Int. Cl.$^4$ ............................................. G06F 13/00
[52] U.S. Cl. ..................................................... 364/200
[58] Field of Search ... 364/200 MS File, 900 MS File

[56] References Cited
U.S. PATENT DOCUMENTS
4,021,779 5/1977 Gardner ............................... 364/200

Primary Examiner—Raulfe B. Zache
Attorney, Agent, or Firm—Staas & Halsey

[57] ABSTRACT

A history control system in data processing system provided with a microprogram processing system. The micro-instructions executed by the microprogram processing system include a control field instructing freeze and release of a history memory. Freeze/release control of history memory based on hardware conditions and freeze/release control by micro-instructions are combined. Thereby, the collecting of internal state information by the history memory is controlled precisely.

3 Claims, 5 Drawing Figures

HISTORY MEMORY CONTROL SYSTEM

BACKGROUND OF THE INVENTION

1. Field of the Invention

This invention relates to a control system for a history memory device which collects internal device state information for use as diagnostic information when faults occur in a data processing system, and more specifically to the freeze and release memory control system thereof.

2. Description of the Prior Art

A data processing system is continuously collecting state information of various latches for control or state display, to aid in the analysis of faults when they are generated. FIG. 1 is a block diagram of an existing history memory.

Block 1 is a data processing system to be diagnosed, 2a to 2n are latches, 3 is a history memory and 4 is a freeze control circuit.

A history memory 3 has, for example, a memory capacity of 256 words and is capable of collecting information 256 times for latches 2a to 2n. However, since the memory capacity is finite, the oldest information must be sent out in order to store the latest information. If the memory is updated by the latest state information, when a fault occurs, history as close as possible to the time of the fault can be obtained.

The freeze control circuit 4 inhibits the update of history memory 3 and freezes the contents of history memory 3 when an error is detected by a machine check or program check, or some other predetermined condition occurs. Examples of predetermined conditions include when the COMPARE-ADDRESS and ADDRESS match, when an instruction for placing the processing system in the STOP condition is issued and when a hardware instruction for freezing history memory 3 is issued. When automatic recovery of the machine, restart by system recovery for a fault or status matching to the predetermined condition occurs, the frozen history memory 3 is released and latch status information is again collected.

However, this system has often showed that the history memory was frozen considerably before the actual failure occurred and therefore necessary status information was not collected and fault analysis could not be performed. Since the condition for starting control of the freeze control circuit 4 is fixed within the machine by the hardware circuit, the collection of system status information can not be controlled as desired even if software controls are added.

SUMMARY OF THE INVENTION

It is an object of this invention to execute the freeze and release control of the history memory using the existing fixed control system in the hardware while making it possible to change the freeze and release control timing as desired.

This invention provides a data processing system including a history memory for storing internal state information by serially collecting it, a freeze control circuit which executes the freeze control for inhibitting update of content of said history memory and the release control which releases the freeze, a means for instructing the freeze or release control in accordance with predetermined hardware conditions and a microprogram processing system. The microprogram processing system executes microinstructions having a control field which contains history control information for control of the history memory. The microprogram processing system includes a device for decoding the control field of a microinstruction and generates a release of freeze signal to the freeze control circuit when the microinstructions contain history control information. Therefore, the history memory is controlled both when a predetermined hardware condition is generated and when a microinstruction having history control information is executed by the microprogram processing system.

DESCRIPTION OF THE PREFERRED EMBODIMENTS

Figure 1:
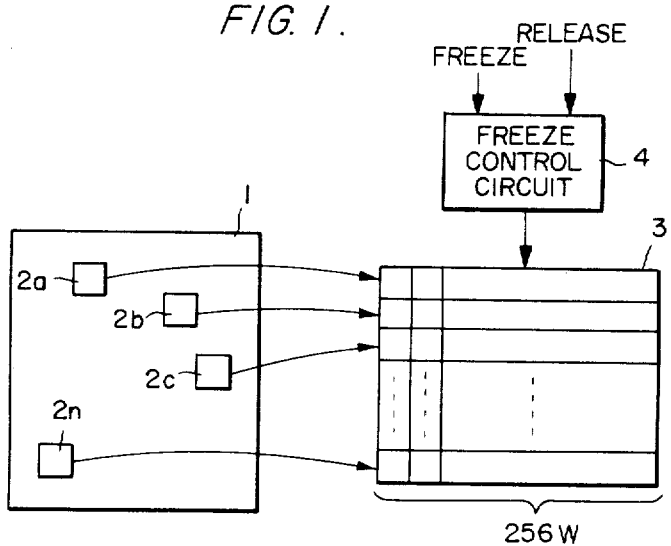
FIG. 1 is a block diagram of an existing history memory device.
Figure 3:
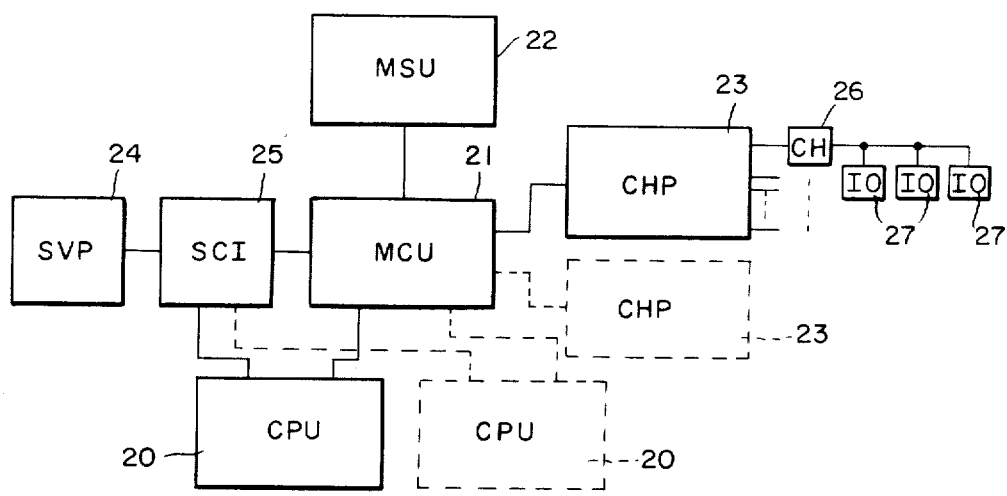
FIG. 3 is a block diagram of a data processing system including a microprogram processing system.
Figure 2:
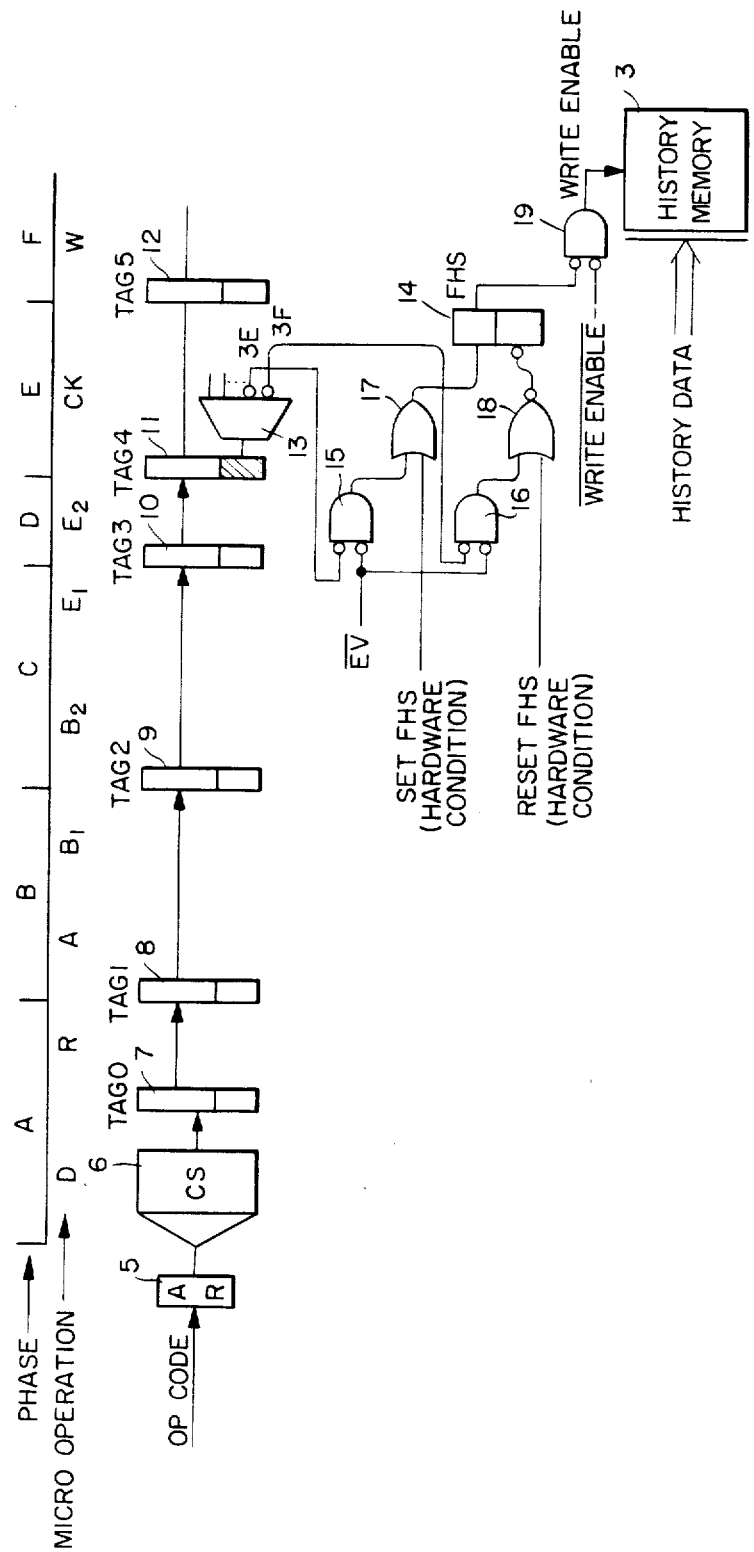
FIG. 2 is a block diagram of a microprogam processing system in an embodiment according to the present invention.

The microprogram processing system in FIG. 2 is provided in the CPU 20 of FIG. 3. Operations of the embodiment in FIG. 2 will now be described. In the pipeline system indicated by blocks 5 to 12, block 5 is an address register AR in which the OP code is loaded. Block 6 is a control storage CS in which the micro operation words are stored at an address corresponding to the OP code. Blocks 7 to 12 are registers called TAG0 to TAG5 which control operation in each phase corresponding to phase A to phase F. The micro-operation words are sequentially shifted from TAG0 to TAG5, and execute sequentially the micro-operations D, R, A, $B_1$, $B_2$, $E_1$, $E_2$, CK, and W in phases A to F. The micro-operation D is a word fetch from CS 6 upon the decoding of the OP code. Micro-operation R controls the address register. Micro-operation A is an address operation. Micro-operations $B_1$ and $B_2$ involve load processing of operands. Micro-operations $E_1$ and $E_2$ execute operations. Micro-operation CK is a data check. Micro-operation W writes data.

In the freeze control circuit, blocks 13 to 19, 13 is a decoder which usually provides operation control. In this embodiment, however, the decoder 13 is used for fetching freeze or release instruction information. Block 14 is a freeze/history latch FHS, 15 and 16 are NOR gates, 17 is an OR gate, and 18 and 19 are NOR gates. In addition, EV is a valid signal in the phase E and SET FHS and RESET FHS are freeze and release signals generated by hardware conditions.

Figure 4:
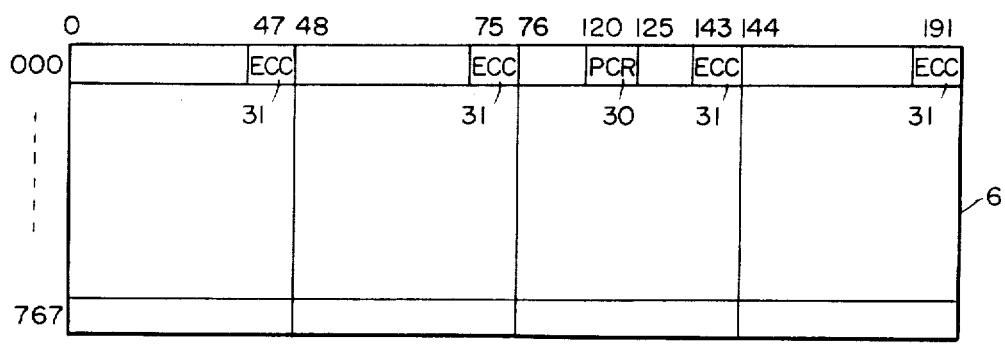
FIG. 4 is a diagram of the control storage (CS) 6 in FIG. 2.

In this embodiment, as shown in FIG. 4, the control memory CS is composed of 768 words × 192 bits. Each word contains several error check correction fields (ECC) 31. In regard to the micro operation words of a history memory control instruction, a code instructing freeze or release of history memory 3 is put in the control region of 6 bits called the process control field (PCR) 30 (however, only if this region is vacant). The code in the PCR 30 is then decoded by the decoder 13, then the write operation of history memory 3 is controlled through the freeze control circuits. For example, assume the hexadecimal code "3E" is the freeze instruction, and "3F" is the release instruction. The NOR gates 15 and 16 are circuits for checking the output of the decoder 13 at the end of phase D which is determined by use of the EV signal. The OR gate 17 provides a logical OR between the freeze signal 3E sent from the decoder 13 generated and release signal RESET FHS by the existing hardware conditions. The NOR gate 18 provides a similar function for the decoder's release signal 3E and the RESET FHS signal.

Thereby, the freeze history latch FHS 14 can be controlled for set and reset by hardware conditions or by microprogram instructions. When the freeze history latch FHS 14 is set by either the freeze signal, the write enable signal is inhibited by the NOR gate 19 and the history memory 3 is frozen. The latch FHS 14 can be reset by either of the release signals. When the latch FHS 14 is released, the write enable signal can be applied to the history memory 3. Note that the decoder 13 used in the embodiment of FIG. 2 is not required to be located after the register TAG4.

Figure 5:
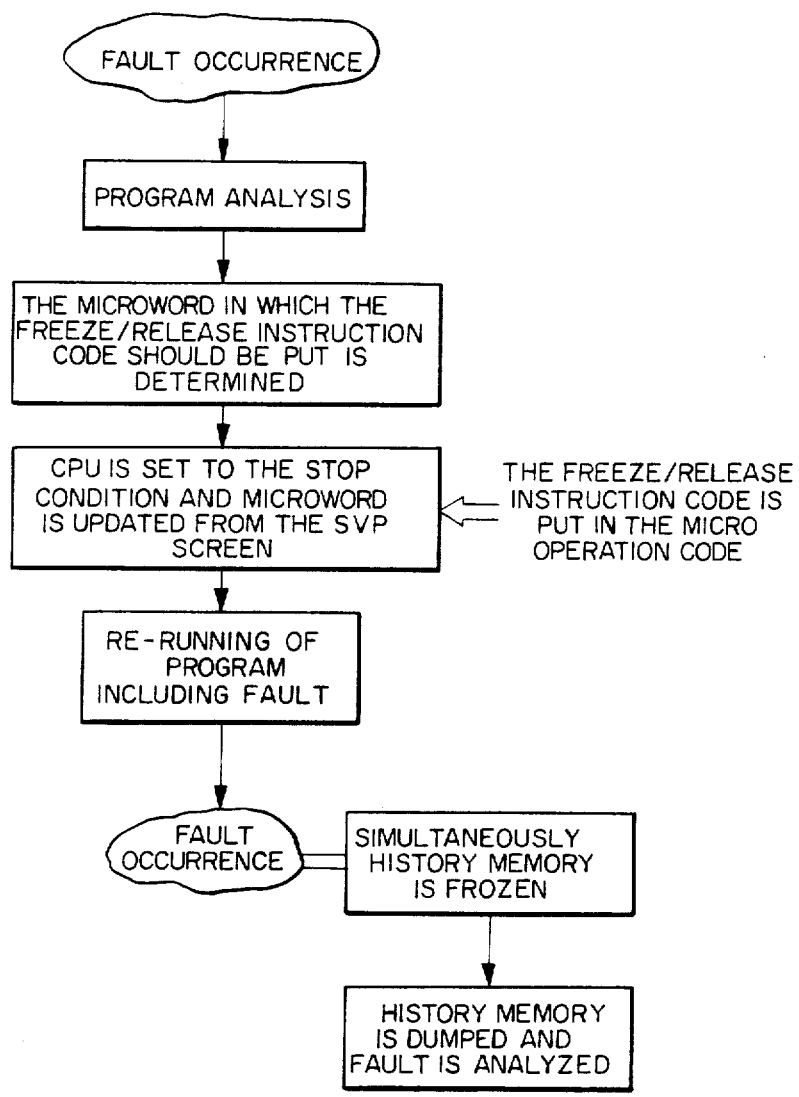
FIG. 5 is an example of a flow chart for putting the freeze/release instruction code in a micro-operation word.

Below, an example of the operation for putting the freeze/release instruction code in the micro-operation word is described by referring to FIGS. 3 and 5. In FIG. 3, block 20 is a central processing unit (CPU), 21 is a memory control unit (MCU), 22 is a main storage unit (MSU), 23 is a channel processor (CHP), 24 is a service processor (SVP), 25 is a system console interface unit (SCI), 26 is a channel unit (CHP) and 27 is an input/output unit (IO).

If a fault occurs, the SVP 24 analyzes to determine in which program a fault has occurred and then determines in which microword the freeze/release instruction code should be put. The SVP 24 puts the CPU 20 in the STOP condition and then changes a microword using the display screen provided thereto and updates the contents of CS 6.

Thereafter, the program which generated the fault is run again. At this time, a freeze instruction code is in a micro-operation word which is nearer to the fault timing, the history memory 3 is frozen at a time so that the internal condition of the CPU 20 before and after the detection of fault is collected accurately. Thereafter the SVP 24 dumps contents of history memory 3 and analyzes the fault.

As described above, this invention is capable of timing the freeze and release of history memory 3 more precisely than the existing system which depends only on the hardware conditions. This is accomplished in the present invention by adequately using the process control field (PCR) of a proper micro-operation word in the control memory 6.

I claim:

1. A history memory control system in a data processing system, comprising:
   a history memory for serially collecting and storing internal state information;
   a freeze control circuit connected to said history memory, for inhibiting update of said history memory and releasing said history memory;
   condition sensing means, connected to said freeze control circuit, for sending first freeze and release signals in accordance with predetermined hardware conditions to said freeze control circuit;
   a microprogram processing system for executing micro-instructions which include a control field for history memory freeze and release micro-instructions;
   decoding means, connected to said freeze control circuit and said microprogram processing system, for decoding the control field in the micro-instructions and sending second freeze and release signals to said freeze control circuit when the history memory freeze and release micro-instructions are decoded, thereby said history memory is controlled both when the predetermined hardware conditions are generated and when history memory freeze and release micro-instructions are executed.

2. A history memory control system according to claim 1,
   wherein said decoding means comprises a decoder, connected to said freeze control circuit and said microprogram processing system, which decodes the control field in the micro-instructions and generates the second freeze and release signals,
   wherein said microprogram processing system generates a valid signal as each of the micro-instructions becomes available to said decoder and the data processing system generates a write enable signal, and
   wherein said freeze control circuit comprises:
      a first gate circuit, connected to said microprogram processing system and said decoder, for ANDing the valid signal and the second freeze signal and generating an output;
      a second gate circuit, connected to said microprogram processing system and said decoder, for ANDing the valid signal and the second release signal and generating an output;
      a third gate circuit, connected to said condition sensing means and said first gate circuit, for ORing the first freeze signal and the output of said first gate circuit and generating a set signal;
      a fourth gate circuit, connected to said condition sensing means and said second gate circuit, for ORing the first release signal and the output of said second gate circuit and generating a reset signal;
      a flip-flop, connected to receive the set signal from said third gate circuit and the reset signal from said fourth gate circuit, outputting a freeze history latch signal; and
      a fifth gate circuit, connected to said flip-flop and to receive the write enable signal, for controlling the write enable signal to said history memory using the freeze history latch signal of said flip-flop.

3. A history memory control system according to claim 1 or claim 2, wherein said microprogram processing system comprises:
   a control memory for storing micro-instructions; and
   a pipeline structure having stages, connected to said decoding means and said control memory, for executing the micro-instructions read from the control memory, whereby the control field for history memory freeze and release micro-instructions is decoded at one of the stages.

* * * * *

UNITED STATES PATENT AND TRADEMARK OFFICE
CERTIFICATE OF CORRECTION

PATENT NO. : 4,559,596

DATED : December 17, 1985

INVENTOR(S) : Ohnishi

It is certified that error appears in the above-identified patent and that said Letters Patent is hereby corrected as shown below:

Column 2, line 5, "of" should be --or--.

Column 3, line 8, after "13" insert --and the freeze signal SET FHS--; delete "and release signal RESET FHS".

Signed and Sealed this

Twenty-fifth Day of March 1986

[SEAL]

Attest:

DONALD J. QUIGG

Attesting Officer

Commissioner of Patents and Trademarks